US008756628B2

(12) United States Patent
Bergmann et al.

(10) Patent No.: US 8,756,628 B2
(45) Date of Patent: Jun. 17, 2014

(54) VIDEO REPRESENTATION DELIVERY SYSTEM AND SERVICE AND A METHOD OF OPERATION THEREOF

(75) Inventors: Ernest E. Bergmann, Bethlehem, PA (US); Scott W. McLellan, Kempton, PA (US)

(73) Assignee: Agere Systems LLC, Wilmington, DE (US)

( * ) Notice: Subject to any disclaimer, the term of this patent is extended or adjusted under 35 U.S.C. 154(b) by 1893 days.

(21) Appl. No.: 10/108,650

(22) Filed: Mar. 28, 2002

(65) Prior Publication Data

US 2003/0188315 A1 Oct. 2, 2003

(51) Int. Cl.
*H04N 7/10* (2006.01)
*H04N 7/025* (2006.01)
*H04N 7/173* (2011.01)

(52) U.S. Cl.
USPC ............... 725/34; 725/32; 725/86; 725/87

(58) Field of Classification Search
USPC .................................. 725/86–103
See application file for complete search history.

(56) References Cited

U.S. PATENT DOCUMENTS

| | | |
|---|---|---|
| 5,692,093 A | 11/1997 | Iggulden et al. |
| 5,696,866 A | 12/1997 | Iggulden et al. |
| 5,701,383 A | 12/1997 | Russo et al. |
| 5,963,264 A | 10/1999 | Jackson |
| 5,987,210 A | 11/1999 | Iggulden et al. |
| 5,995,160 A | 11/1999 | Rumreich |
| 6,002,831 A | 12/1999 | Tada et al. |
| 6,101,310 A | 8/2000 | Terada et al. |
| 6,181,364 B1 | 1/2001 | Ford |
| 6,226,444 B1 | 5/2001 | Goldschmidt Iki et al. |
| 6,230,320 B1 | 5/2001 | Gakumura |
| 6,240,240 B1 | 5/2001 | Nagano et al. |
| 6,263,505 B1 | 7/2001 | Walker et al. |
| 6,266,481 B1 | 7/2001 | Lee et al. |
| 6,275,646 B1 | 8/2001 | Tada et al. |
| 6,321,383 B1 * | 11/2001 | Funahashi et al. ............... 725/92 |
| 6,662,365 B1 * | 12/2003 | Sullivan et al. ................. 725/25 |
| 2003/0226150 A1 * | 12/2003 | Berberet et al. ................ 725/94 |

* cited by examiner

*Primary Examiner* — Nasser Goodarzi
*Assistant Examiner* — Fred Peng

(57) ABSTRACT

A video delivery system and service for use with a video presentation and methods of delivering and receiving a video representation. In one embodiment, a method of receiving a video representation includes receiving a request to program a video viewing device to record a video presentation employing a selected content. The method also includes remotely programming the video viewing device employing the selected content to provide the video representation.

21 Claims, 5 Drawing Sheets

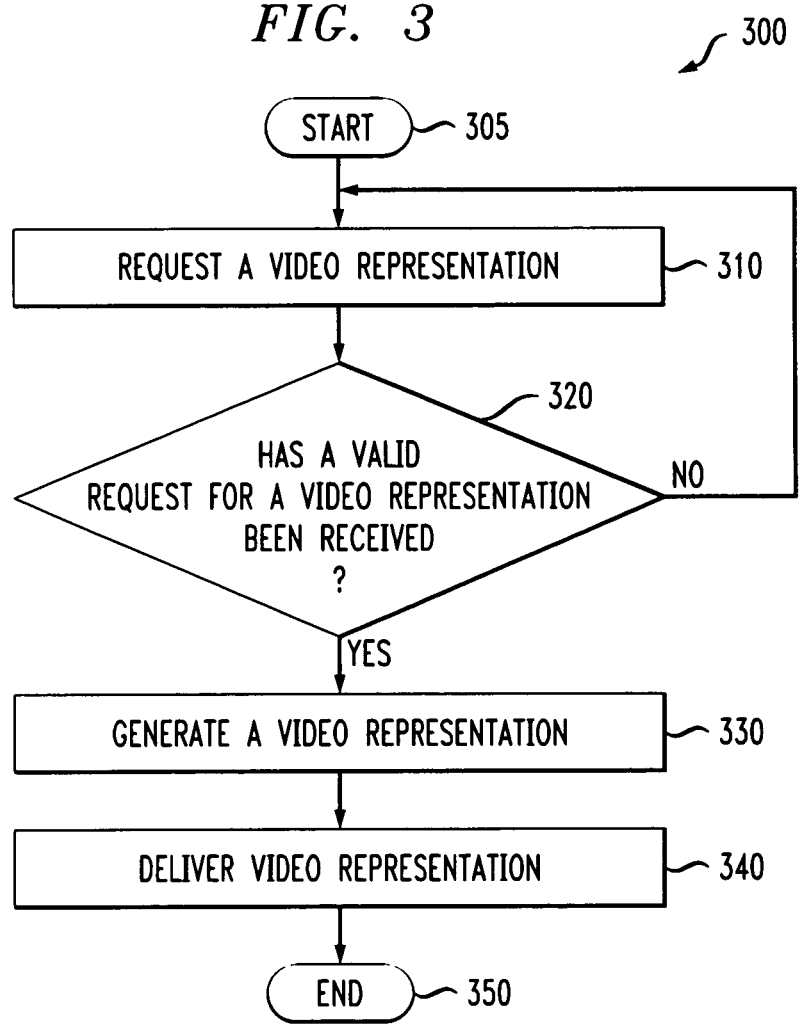

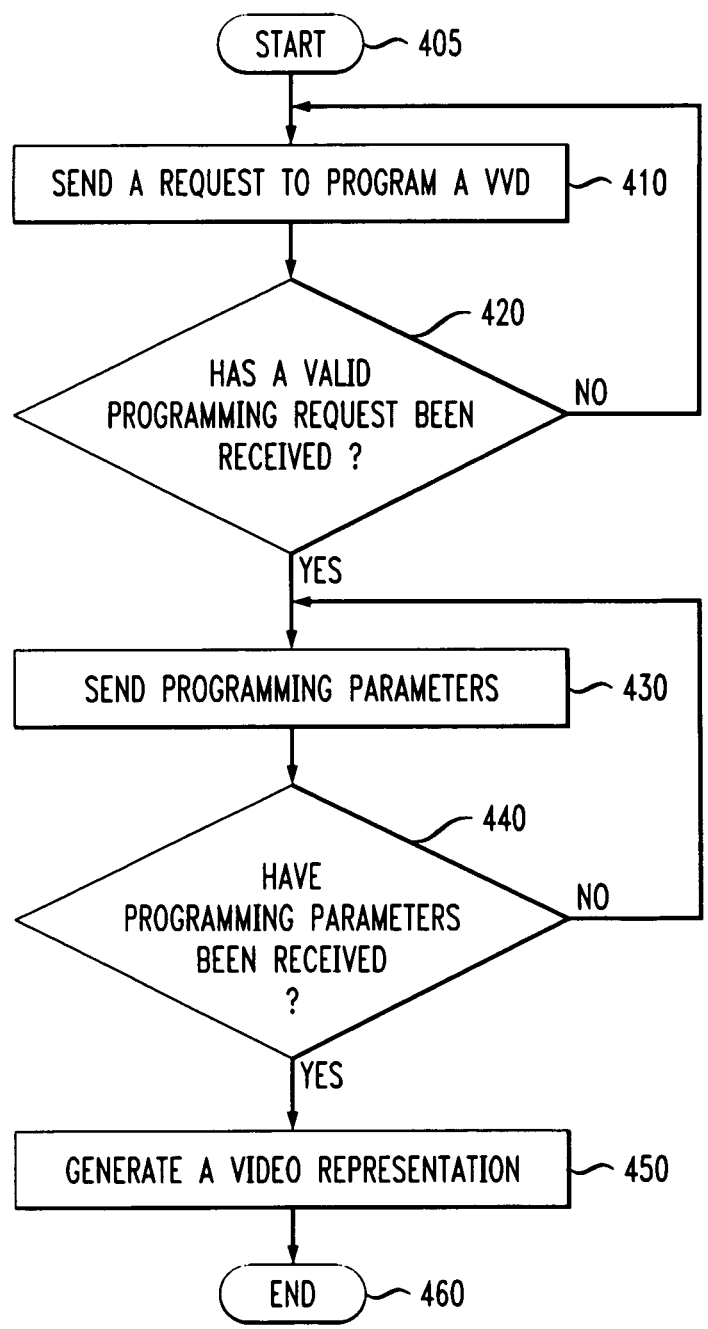

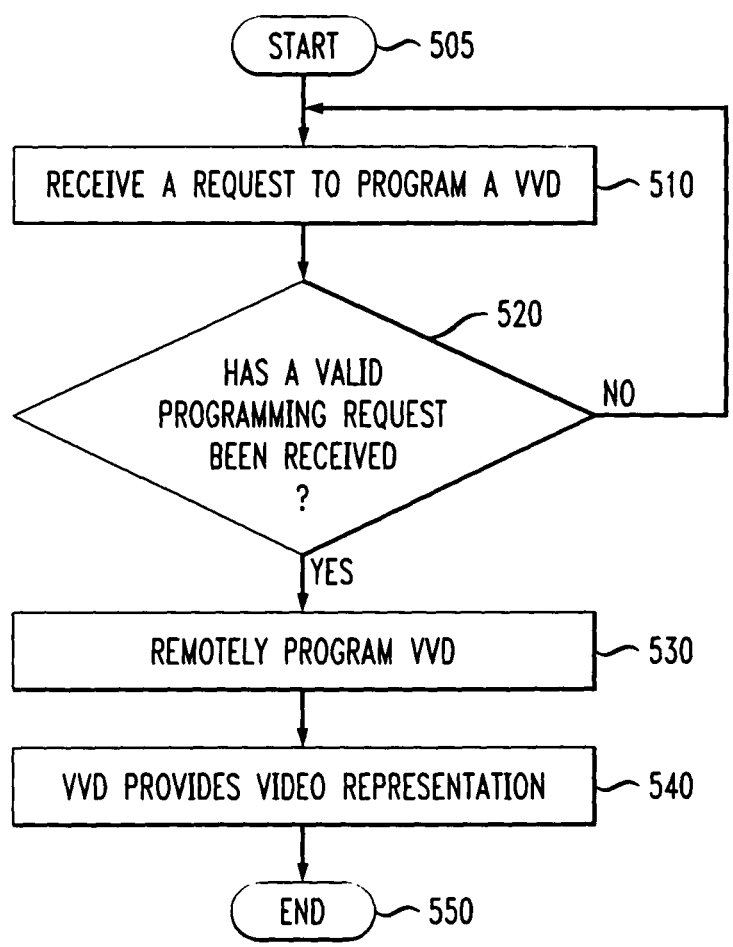

VIDEO REPRESENTATION DELIVERY SYSTEM AND SERVICE AND A METHOD OF OPERATION THEREOF

TECHNICAL FIELD OF THE INVENTION

The present invention is directed, in general, to multimedia delivery systems and, more specifically, to a system, service and method for delivering a video representation including programming a video viewing device via the Internet.

BACKGROUND OF THE INVENTION

Television is one of the most influential forces of our time. Through a television set, a person is able to receive news, sports, entertainment, information and commercials. The average person spends between two and five hours a day viewing a television set. With the addition of cable and satellite, a person can now watch television programming is essentially available every hour of the day. The increase in the availability of television stations also allows the option to choose the type of program.

Still, because of busy schedules or a programming conflict, a person may not be able to view all of the programs desired. To manage television viewing, a person will often record a desired program in order to view it at another time. Additionally, a person may want to record a program and view it at their convenience with the option of fast forwarding through or skipping over undesired portions of the program. For example, a person may record a television show and then fast forward through commercials when viewing. Another person may record a sports event and then fast forward through timeouts or slow play. Still, other people may record programs and view them to allow for the option of skipping through undesirable or objectional scenes.

To achieve the above television viewing, however, a person must program their video recorder, such as a Video Cassette Recorder (VCR), to record the desired event. This nevertheless, can be time consuming. Additionally, a person may forget or is unexpectedly away from their home when the desired program appears on television and is, therefore, unable to program their VCR.

Other problems may also develop when programming a VCR. For instance, a power outage may occur after a VCR has been successfully programmed. Additionally, scheduling changes may result in a recording of an undesired program. Also, if a program is recorded correctly, a person must still fast forward through commercials or other portions that they find objectional when viewing the program.

Several products have been developed to assist people in recording and replaying television programs. For instance, VCR Plus has made programming a VCR a much simpler task. There are also devices that allow a person to view a recorded program without commercials. These can be seen in U.S. Pat. No. 6,275,646, entitled "Image Recording/Reproducing Apparatus," to Tada, et al., issued Aug. 14, 2001; U.S. Pat. No. 6,002,831, entitled "Image Recording/Reproducing Apparatus," to Tada, et al., issued Dec. 14, 1999; U.S. Pat. No. 6,226,444, entitled "Method and Apparatus for Recording Program Data Without Commercials," to Goldschmidt Iki, et al., issued May 1, 2001; U.S. Pat. No. 5,987,210 entitled "Method and Apparatus for Eliminating Television Commercial Messages," to Iggulden, et al., issued Nov. 16, 1999; and U.S. Pat. No. 5,692,093, entitled "Method and Apparatus for Eliminating Television Commercial Messages," to Iggulden, et al., issued Nov. 25, 1997, which are herein incorporated by reference. Another development has allowed people to have a continuous recording track that can be accessed by separate read and write facilities. This device enables people to have VCR-like program control features while still recording the program. This is demonstrated in U.S. Pat. No. 5,701,383, entitled "Video Time-Shifting Apparatus," to Russo, et al. (Russo), issued Dec. 23, 1997, which is also herein incorporated by reference.

Additionally, there are several filtering devices available that allow a user to view a program without objectional language. Recent developments also allow a user to view a program at a certain rating. For example, U.S. Pat. No. 6,181,364, entitled "System for Filtering Content from Videos," to Ford, issued Jan. 30, 2001 filters content at a certain rating and replaces that portion with content of a desired rating.

While these advances in recording have given more flexibility to viewers, there are still some limitations. For instance, even though there are some devices to assist a person in programming a VCR, a person still must program it to record the desired program. A person may want to skip more than just commercials or objectional scenes. Also, a person may record a sporting event and, in addition to commercials, fast forward through time outs or slow action of the event. In addition, a parent may want a desired program for viewing by their entire family but a filtered version of the program is not available. Finally, advertisers may object to video productions being reproduced without the commercials.

Accordingly, what is needed in the art is a service that can deliver a version (e.g., an edited version) of a selected video presentation based on a request of a viewer.

SUMMARY OF THE INVENTION

To address the above-discussed deficiencies of the prior art, the present invention provides a video delivery system for use with a video presentation. In one embodiment, the video delivery system includes a receptor subsystem coupled to a rejoinder subsystem. The receptor subsystem receives a request from a user for a video representation having a selected content of the video presentation. The rejoinder subsystem controls a video viewing device to generate the video representation for the user.

In another aspect, the present invention provides a method of delivering a video representation that includes receiving a request from a user for a video representation having a selected content of a video presentation. The method further includes generating the video representation of the video presentation, and delivering the video representation to the user.

In yet another aspect, the present invention provides a method of receiving a video representation. This method includes sending a request to program a video viewing device employing a selected content, and receiving programming parameters to provide the selected content. The method also includes generating the video representation by the video viewing device employing the programming parameters.

In still yet another aspect, the present invention provides an additional method of receiving a video representation that includes receiving a request to program a video viewing device to record a video presentation employing a selected content, and remotely programming the video viewing device employing the selected content to provide the video representation.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIG. 3 illustrates a flow diagram of an embodiment of a method of delivering a video representation constructed in accordance with the principles of the present invention;

FIG. 4 illustrates a flow diagram of an embodiment of a method of receiving a video representation constructed in accordance with the principles of the present invention; and FIG. 5 illustrates a flow diagram of another embodiment of a method of receiving a video representation constructed in accordance with the principles of the present invention.

DETAILED DESCRIPTION

Figure 1:
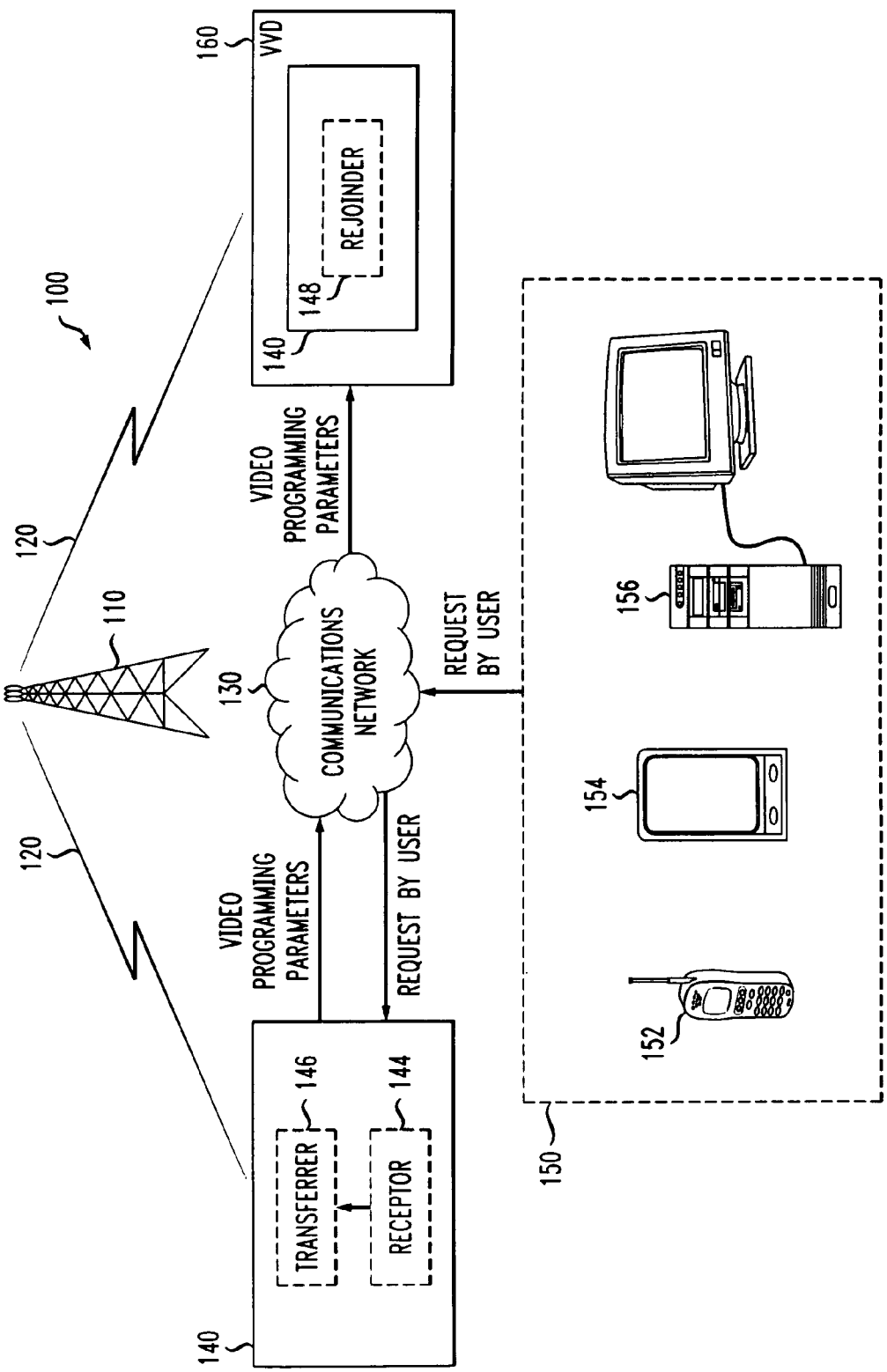
FIG. 1 illustrates a system diagram of an embodiment of a video delivery service constructed in accordance with the principles of the present invention.

Referring initially to FIG. 1, illustrated is a system diagram of an embodiment of a video delivery service, generally designated 100, constructed in accordance with the principles of the present invention. The video delivery service 100 includes a broadcast tower 110, a video broadcast 120, a communications network 130, a video delivery system 140, a requester 150 and a video viewing device 160 (shown as VVD in FIG. 1). The video delivery system 140 includes a receptor subsystem 144, a transferrer subsystem 146 and a rejoinder subsystem 148 coupled to the receptor 144 and the transferrer subsystem 146. Additionally, the requester 150 includes a telephone 152, a personal digital assistant (PDA) 154 and a computer 156.

The broadcast tower 110 is a conventional broadcast tower that is configured to deliver the video broadcast 120 to a television antenna. The video broadcast 120 may be a typical broadcast signal that is made public by television. In the illustrated embodiment, the video delivery system 140 and the video viewing device 160 receive the video broadcast 120 from the broadcast tower 110. The video delivery system 140 may receive the video broadcast 120 through an associated conventional television antenna. Similarly, the video viewing device 160 may receive the video broadcast 120 through another conventional television antenna associated with the video viewing device 160. In some embodiments, the television antenna may be associated with the video viewing device 160 via a conventional television.

Alternatively, the video broadcast 120 may be received by the video delivery system 140 and the video viewing device 160 through other mediums or combinations of mediums. For example, the video broadcast 120 may be received via cable, a computer or computer network, satellite or the communications network 130. One skilled in the pertinent art will understand that the video delivery system 140 may be configured to receive the video broadcast 120 via several mediums.

The communications network 130, in the illustrated embodiment, may be any conventional network that supports respective communication between computers, telephony devices or other communications devices. The communications network 130 may be either wireless, hardwired or a combination of the two. In an exemplary embodiment, the communications network 130 may be the Internet. One skilled in the pertinent art also understands that the communications network 130 may employ communications between any number of video delivery systems 140, requesters 150 or video viewing devices 160.

As stated above, the video delivery system 140 includes the receptor subsystem 144, the transferrer subsystem 146 and the rejoinder subsystem 148. In the illustrated embodiment, the receptor subsystem 144 receives a request from a user via the communications network 130 for a video representation having a selected content of the video broadcast 120. In an exemplary embodiment, the request is sent by the user via the Internet. The receptor subsystem 144 processes the request and forwards instructions for the video representation based on the request to the transferrer subsystem 146. The transferrer subsystem 146 receives the instructions from the receptor subsystem 144 and generates programming parameters based on the instructions. After generating the programming parameters, the transferrer subsystem 146 delivers the programming parameters via the communications network 130 to the rejoinder subsystem 148 within the video viewing device 160 designated by the user. The rejoinder subsystem 148 receives the programming parameters from the transferrer subsystem 146 and controls the video viewing device 160 via the programming parameters so that the video viewing device 160 generates the video representation having the selected content from the video broadcast 120. The rejoinder subsystem 148 may be a dedicated device that is adapted to receive the programming parameters via the Internet and then control the video viewing device 160 based on the programming parameters. In some embodiments, the rejoinder subsystem 148 may be located adjacent to the video viewing device 160.

The video delivery system 140 may be a conventional computer capable of receiving, storing and delivering multimedia information such as video representations through a connection to the communications network 130. In alternative embodiments, the video delivery system 140 may be a dedicated device that is constructed of special-purpose hardware employing a software program, which directs its operation. In other embodiments, the video delivery system 140 may be a manual operation wherein the receptor is an employee of the video delivery service 100, and the video representation is created by manually operating a video recording device such as a Video Cassette Recorder (VCR).

As stated above, the video viewing device 160 generates the video representation based on the programming parameters through the control of the rejoinder subsystem 148. In some embodiments, the video viewing device 160 may generate the video representation by employing programming parameters that include initiation signals. The initiation signals may be used to indicate when to stop or start recording portions of the video presentation. For example, a selected content may include no advertisements. In this example, the rejoinder subsystem 148 may control the video viewing device 160 to stop recording when an initiation signal indicates an advertisement and then begin recording again when an initiation signal indicates that the advertisement has ended. In other embodiments, an initiation signal may be broadcast with the video presentation to indicate events other than advertisements. For instance, initiation signals may be used to indicate the beginning and end of objectional scenes related to a specified rating. The operation of the rejoinder subsystem 148 will be discussed below in more detail with reference to FIG. 2.

The user may request the video representation with the requester 150. As illustrated in FIG. 1, the requester 150 may be the telephone 152. The telephone 152 may be a conventional hardwired telephone located at a residence, a business, a payphone, etc. Alternatively, the telephone 152 may be an analog or digital mobile telephone. In one embodiment, the telephone 152 may be a digital mobile telephone capable of delivering the request using text messaging.

Also illustrated in FIG. 1, the requester 150 may be the PDA 154. Those skilled in the pertinent art are familiar with PDAs, such as those commercially available from Palm™ by Palm Inc. of Santa Clara, Calif., Handspring™ by Handspring, Inc. of Mountain View, Calif. or other suppliers. Any PDA employed in the illustrated embodiment may be equipped to operate in a Bluetooth communications environment or other wireless communications environment. Of course, other wireless or wireline devices may also be used as the requester 150, and fall within the broad scope of the present invention.

As illustrated, the requester 150 may also be the computer 156. The computer 156 may be a conventional computer that is capable of sending the request through a connection to the communications network 130. The request may simply be an e-mail that indicates the video broadcast 120 and selected content for the desired video representation. In another embodiment, the computer 156 may be used to complete a request form at a website of the video delivery service 100.

In other embodiments, the requester 150 may simply be a physical interaction between the user and a representative of the video delivery service 100. For example, the video delivery service 100 may include business locations or stores where patrons could personally deliver the request for a video representation having the selected content. In other embodiments, the request by the user may be delivered via written correspondence. In an exemplary embodiment, the request may be sent by the user via the Internet.

The request from the user for a video representation may include the selected content. The selected content allows each user to direct the video delivery service 100 to customize a video broadcast 120 or another video presentation for their viewing. The selected content may include an exclusion of advertisements, an arrangement of advertisements, or a compilation of targeted advertisements. Alternatively, the selected content may include a specified rating, an alternative language or an alternative language with subtitles. Additionally, the selected content may include a compilation of specified scenes or an existing video file. Choosing a selected content allows the user to specifically determine what he or she would like to view. The selected content will be discussed in more detail below with reference to FIG. 2 and FIG. 3.

In the illustrated embodiment, the video viewing device 160 generates a video representation employing the control of the rejoinder subsystem 148. In one embodiment, the video viewing device 160 may be a wireless device. In another embodiment, the video viewing device 160 may be a common VCR. In alternative embodiments, the video viewing device 160 may be a Digital Versatile Disk (DVD) player or a computer and screen that is capable of displaying video. In addition, the video viewing device 160 may be a PDA. One skilled in the art will understand that the video viewing device 160 may be any device capable of displaying a video representation.

In the illustrated embodiment, the video delivery system 140 is distributed. For example, the rejoinder subsystem 148 is physically located separately from the receptor subsystem 144 and the transferrer subsystem 146. In other embodiments, the video delivery system 140 may be centralized. In a centralized video delivery system, the rejoinder subsystem 148 may be physically located with the receptor subsystem 144 such that the transferrer subsystem 146 is not necessary. Instead, the rejoinder subsystem 148 may directly receive the instructions from the receptor subsystem 144 and generate programming parameters based on the instructions. Additionally, in a centralized video delivery system, the rejoinder subsystem 148 may employ the programming parameters to control a video viewing device that is physically located with the receptor subsystem 144 and the rejoinder subsystem 148. The centralized video delivery system could then, depending on the request by the user, send either programming parameters or a video representation to the video viewing device 160 designated by the user.

In these embodiments, a centralized video delivery system may generate the video representation remotely from the video viewing device 160, and then send the video representation to the video viewing device 160. The video delivery service 100 may deliver the video representation by the communications network 130. In an exemplary embodiment, the video representation may be sent to the designated video viewing device 160 via the Internet. The video delivery service 100 may also deliver the video representation by other methods. For example, the video representation may also be delivered through the postal system by private or public carriers. In other embodiments, the video representation may be delivered to the user at a store employed by the video delivery service 100. A centralized video delivery system will be discussed in more detail below with respect to FIG. 2.

Figure 2:
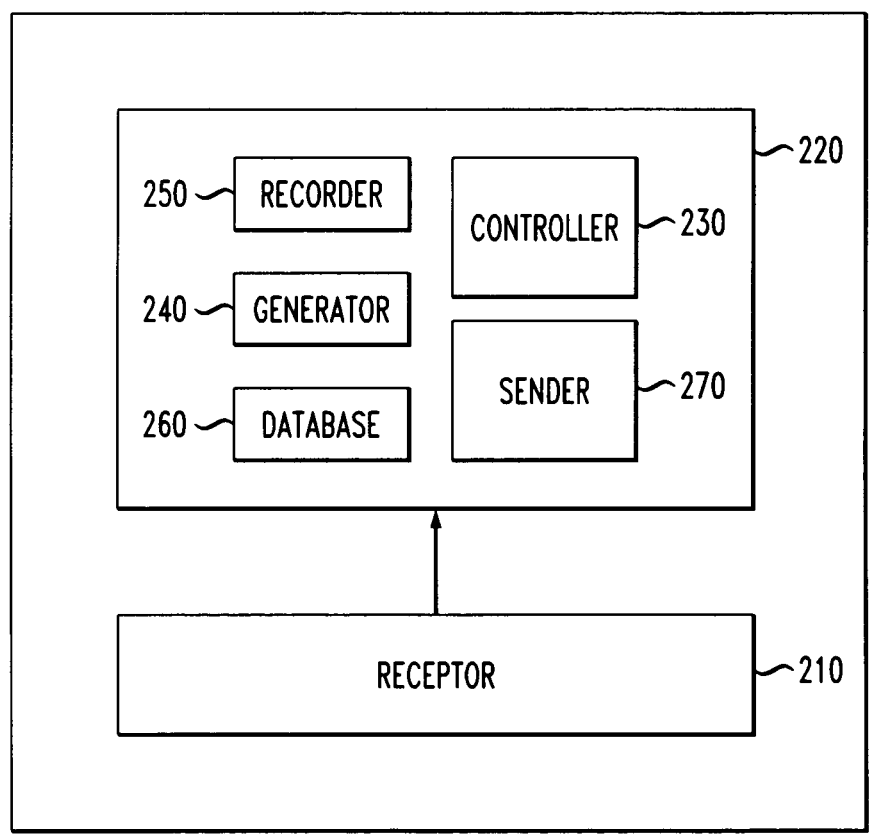
FIG. 2 illustrates a block diagram of an embodiment of a video delivery system constructed in accordance with the principles of the present invention.

Turning now to FIG. 2, illustrated is a block diagram of an embodiment of a video delivery system, generally designated 200, constructed in accordance with the principles of the present invention. The video delivery system 200 includes a receptor subsystem 210 and a rejoinder subsystem 220. In FIG. 1, the video delivery system 200 and the receptor subsystem 210 are represented by the video delivery system 140 and the receptor subsystem 144, respectively. The rejoinder subsystem 220 includes a controller 230, a generator 240, a recorder 250, a database 260, and a sender 270. It should be noted that other components not shown may be included within the video delivery system 200 without departing from the scope of the present invention. The video delivery system 200, in the illustrated embodiment, is a dedicated device that is constructed of special-purpose hardware employing a software program, which directs its operation. Other embodiments, of course, may employ a device that is special purpose hardware or that is general purpose hardware, such as a computer, which is software enabled.

The receptor subsystem 210 receives a request from a user for a video representation having a selected content of a video presentation. As discussed above with respect to FIG. 1, the request may be initiated in a variety of ways, such as, initiated by a PDA, a telephony communication, a computer, a physical interaction, or a written correspondence. Once the request has been received, the receptor subsystem 210 sends instructions based on the request to the rejoinder subsystem 220. The instructions will direct the rejoinder subsystem 220 to generate the video representation based on the selected content. The instructions may be created from a form that is completed by the user on a web page. Alternatively, the instructions may be developed by software that informs the rejoinder subsystem 220 what video presentation and selected content to employ in generating the video representation. In addition, the instructions may be manually entered into the rejoinder subsystem 220.

The controller 230 of the rejoinder subsystem 220 receives the instructions from the receptor subsystem 210. Based on the instructions, the controller 230 coordinates the generator 240, the recorder 250, the database 260 and the sender 270 to generate and deliver the video representation. One skilled in the art will understand, however, that not all of the components of the rejoinder subsystem 220 illustrated in FIG. 2 may be necessary to generate and deliver a video representation having a selected content.

In the illustrated embodiment, the generator 240 may generate the video representation by controlling the recorder 250 or implementing the database 260. For example, the user may have requested a video representation of a video presentation which is a particular video broadcast having a selected content of the advertisements arranged at the end of the video broadcast. In this instance, the generator 240 may control the recorder 250 when recording the video broadcast such that the recorded advertisements are stored on the database 260. In one embodiment, an initiation signal may be used to indicate when to begin and end recording. The video representation is then completed when the generator 240 positions the stored advertisements, typically stored in the database 260, at the end of the video broadcast recorded by the recorder 250.

The interaction of the generator 240, the recorder 250 and the database 260 may depend on the video presentation and the selected content chosen by the user. For instance, if the selected content is an exclusion of advertisements, then the generator 240 and the recorder 250 may only be involved in generating the video representation. In some embodiments, the advertisements may not be recorded when generating the video representation. In other embodiments, the advertisements may be recorded and then deleted.

Alternatively, the user may request a selected content of a compilation of targeted advertisements. In this example, the controller 230 may coordinate the generator 240 and the recorder 250 to record a video broadcast without advertisements. The 240 may then generate the video representation by contributing advertisements from the database 260 directed to a particular profile of the user to the video broadcast that was recorded without advertisements. In this example, advertisers would be more able to direct their advertisements to a desired market of consumers.

The recorder 250 is configured to record a video presentation. The video presentation may be a video broadcast received through a television antenna as discussed above with reference to FIG. 1. In other embodiments, the video presentation may be received through a television cable, a satellite system, a computer network or a communications network. The recorder 250 may record all or a portion of the video presentation. In some embodiments, the recorder 250 may be a conventional VCR. In other embodiments, the recorder 250 may be another video viewing device such as a DVD writer or a conventional computer that writes the desired video presentation to a hard drive. In still other embodiments, the recorder 250 may be located at the residence of the user and may be remotely programmed by the controller 230 via the Internet.

In the illustrated embodiment, the database 260 is employed on a hard drive of a conventional computer. In other embodiments, the database 260 may include a system of DVD's, video tape or any other medium capable of storing video data that can later be retrieved. Still, alternative embodiments may also include hardware specifically designed to receive and store video data that is subsequently retrievable.

The database 260 may contain advertisements that are organized by target areas, such as, topic, customer age, spending capabilities, or geographic location. Alternatively, the database 260 may contain existing video representations that have been previously generated from the requests of other users. The database 260 may also contain a library of existing video representations that may be advertised for purchase.

In the illustrated embodiment, the sender 270 receives the video representation from the generator 240, and delivers the video representation to a user via a communications network. In alternative embodiments, the sender 270 may deliver the video representation by a cable or satellite system. In other embodiments, the sender 270 may deliver the video representation to the user through a postal system. The sender 270 allows the user to request a video representation from multiple locations that may be remote from where the video representation is delivered. In one instance, a user may request a video representation from an office, and have the video representation delivered to a video viewing device, such as a VCR or a DVD, at a residence. In addition, the video viewing device may be a video capable computer and screen or a wireless video viewing device.

Turning now to FIG. 3, illustrated is a flow diagram of an embodiment of a method, generally designated 300, of delivering a video representation constructed in accordance with the principles of the present invention. The method 300 starts in a step 305 with an intent to obtain a video representation.

Following the step 305, a user requests a video representation in a step 310. The request from the user will include a selected content and a video presentation. The video presentation, for example, may be from a video broadcast that will be broadcast in the future, or from a database of video presentations that have already been broadcast. In some instances, the desired video representation having the selected content may have already been generated.

The selected content of the video presentation may involve advertisements, a specified rating or an alternative language. In addition, the selected content may include a compilation of selected scenes or an existing video file. For example, a user may request a video representation of a football game that only includes third down plays or plays that resulted in a touchdown. Additionally, a user may request a video representation in an existing video file that has been advertised.

After a video representation has been requested, a video delivery system determines if a valid request for a video representation has been received in a first decisional step 320. A receptor of the video delivery system may determine if a valid video representation request has been received by confirming that a valid video presentation and selected content have been requested. As discussed previously with respect to FIGS. 1 and 2, the video delivery system may receive the request in several different ways.

After determining that a valid request has been received, the video delivery system generates a video representation in a step 330. The video delivery system generates the video representation based on the request received from the user. The video delivery system may generate the video representation by employing initiation signals to indicate advertisements or selected scenes. In other embodiments, the video delivery system may generate the video representation using known times to indicate when an advertisement, an objectional scene or a desired scene has begun or ended. In alternative embodiments, the video representation may be generated by manually editing a recording of the video presentation.

When the video representation has been generated, the video delivery system delivers the video representation in a step 340. The video delivery system may deliver the video representation to the user through a communications network. In one embodiment, the video delivery system may deliver the video representation to a wireless video viewing device as directed by the user. Finally, delivering a video representation ends in a step 350.

Returning now to the first decisional step 320, if the request for a video representation has not been received, the method 300 returns to the first step 310 for a user to request a video representation.

Turning now to FIG. 4, illustrated is a flow diagram of an embodiment of a method, generally designated 400, of receiving a video representation constructed in accordance with the principles of the present invention. The method 400 starts in a step 405 with an intent to receive a video representation.

Following the step 405, a user sends a request to program a video viewing device (shown as VVD in FIG. 4) employing a selected content in a step 410. The user may send the request to program the video viewing device through several methods including a communications network or a postal system. In an exemplary embodiment, the user may send a request to program a video viewing device via the Internet. The video viewing device that the user requested to be programmed may be located in the residence of the user or at another location. In some embodiments, the video viewing device may be a wireless device. In other embodiments, the video viewing device may be a conventional VCR adapted to receive programming parameters via the Internet. For example, the video viewing device may be a conventional VCR with a rejoinder subsystem.

The user may initiate the request to program the video viewing device via a PDA, a telephony communication, a computer, a physical interaction or a written correspondence. The physical interaction may involve the user requesting the programming in person at a store associated with a video delivery service. In another embodiment, the physical interaction may involve the user interacting with a menu system on the video viewing device. The selected content may include an exclusion of advertisements, an arrangement of advertisements, a compilation of targeted advertisements, a specified rating, an alternative language, an alternative language with subtitles or a compilation of specified scenes.

After sending a request to program, a video delivery system determines if a valid programming request has been received in a first decisional step 420. The video delivery system may determine if a valid programming request has been received by determining if an appropriate video viewing device has been identified. For example, the video delivery system may determine if it can communicate with the identified video viewing device via the Internet. One skilled in the art will understand testing for a communication link via the Internet. Additionally, the video delivery system may determine if the selected content is valid or if a valid video presentation has been selected.

After determining that a programming request has been received, the video delivery system sends programming parameters to a video viewing device in a step 430. In one embodiment, the program parameters may be sent to the video viewing device through the communications network. In an exemplary embodiment, the program parameters are sent to the video viewing device via the Internet. The programming parameters instruct the video viewing device to record a video presentation in order to generate a video representation having the selected content per the request to program.

After the programming parameters have been sent, the video delivery system determines if the video viewing device has received the programming parameters in a second decisional step 440. A confirmation that the video viewing device received the programming parameters may be sent through a communications network, such as the Internet.

The video viewing device then generates a video representation in a step 450. Finally, receiving a video representation ends in a step 460.

Returning now to the first decisional step 420, if the programming request has not been received, the method 400 returns to the first step 410 to send a request to program the video viewing device. Also, returning to the second decisional step 440, if the video viewing device has not received the programming parameters, then the method 400 returns to the step 430.

Turning now to FIG. 5, illustrated is a flow diagram of an embodiment of a method, generally designated 500, of receiving a video representation constructed in accordance with the principles of the present invention. The method 500 starts in a step 505 with an intent to receive a video representation.

Following the step 505, a video delivery service receives a request to program a video viewing device (shown as VVD in FIG. 5) to record a video presentation employing a selected content in a step 510. In an exemplary embodiment, the video delivery service may receive the request to program the video viewing device via the Internet. The video viewing device may be located in the residence of a user or at another location. In some embodiments, the video viewing device may be a wireless device. In other embodiments, the video viewing device may be a conventional VCR adapted to receive programming parameters via the Internet. For example, the video viewing device may be a conventional VCR with a rejoinder subsystem. In alternative embodiments, the video viewing device may a DVD or a video capable computer and screen. The selected content may include an exclusion of advertisements, an arrangement of advertisements, a compilation of targeted advertisements, a specified rating, an alternative language, an alternative language with subtitles or a compilation of specified scenes.

After receiving a request to program, the video delivery service determines if the received programming request is a valid programming request in a first decisional step 520. The video delivery service may determine if the received programming request is a valid programming request by determining if an appropriate video viewing device has been identified. For example, the video delivery service may determine if communications can be established with the identified video viewing device via the Internet. One skilled in the art will understand testing for a communication link via the Internet. Additionally, the video delivery service may determine if the selected content is valid or if a valid video presentation has been selected.

After determining that the received programming request is valid, the video delivery service remotely programs the video viewing device to record the video presentation based on the selected content in a step 530. In one embodiment, the video delivery service remotely programs the video viewing device employing initiation signals. In an exemplary embodiment, the video delivery service remotely programs the video viewing device by sending programming parameters to the video viewing device via the Internet. The programming parameters instruct the video viewing device to record the video presentation in order to generate the video representation having the selected content per the received programming request.

After the video delivery service remotely programs the video viewing device, the video viewing device then provides a video representation in a step 540. Finally, receiving a video representation ends in a step 550.

Returning now to the first decisional step 520, if a valid programming request has not been received, the method 500 returns to the first step 510 and waits to receive a request to program a video viewing device.

Although the present invention has been described in detail, those skilled in the art should understand that they can make various changes, substitutions and alterations herein without departing from the spirit and scope of the invention in its broadest form.

What is claimed is:

1. A video delivery system for use with a video presentation, comprising:
    a receptor subsystem configured to receive a request from a user to generate a video representation having a beginning and an end and having a selected content of said video presentation, wherein said selected content includes a selectable one of an exclusion of advertisements, an arrangement of advertisements at the end of the presentation, and a compilation of targeted advertisements according to a profile of the user; and
    a rejoinder subsystem coupled to said receptor subsystem configured to control a video viewing device configured to generate said video representation for said user based on said request;
    wherein said rejoinder subsystem controls said video viewing device through programming parameters based on said request, said programming parameters received over a communications network from said receptor subsystem.

2. The video delivery system as recited in claim 1 wherein said selected content is selected based on a selection criterion from the group consisting of:
    a specified rating,
    an alternative language, and
    an alternative language with subtitles.

3. The video delivery system as recited in claim 1 wherein said request is initiated by at least one from the group consisting of:
    a personal digital assistant,
    a telephony communication,
    a computer,
    a physical interaction, and
    a written correspondence.

4. The video delivery system as recited in claim 1 wherein said video viewing device includes at least one from the group consisting of:
    a Digital Versatile Disk (DVD),
    a Video Cassette Recorder (VCR), and
    a wireless video viewing device.

5. A method of delivering a video representation, comprising:
    receiving a request from a user to generate a video representation having a beginning and an end and having a selected content of a video presentation, wherein said selected content includes a selectable one of an exclusion of advertisements, an arrangement of advertisements at the end of the presentation, and a compilation of targeted advertisements according to a profile of the user;
    generating said video representation of said video presentation based on said request;
    delivering said video representation to said user;
    transmitting over a communications network programming parameters based on said request and generating said video representation according to said programming parameters.

6. The method as recited in claim 5 wherein said selected content is selected based on a selection criterion from the group consisting of:
    a specified rating,
    an alternative language, and
    an alternative language with subtitles.

7. The method as recited in claim 5 wherein said request is initiated by at least one from the group consisting of:
    a personal digital assistant,
    a telephony communication,
    a computer,
    a physical interaction, and
    a written correspondence.

8. The method as recited in claim 5 wherein said video representation is delivered to at least one from the group consisting of:
    a Digital Versatile Disk (DVD),
    a Video Cassette Recorder (VCR), and
    a wireless video viewing device.

9. A method of receiving a video representation, comprising:
    send a request over a communications network to program a video viewing device of a user employing a selected content, wherein said selected content includes a selectable one of an exclusion of advertisements, an arrangement of advertisements at an end of said content, and a compilation of targeted advertisements according to a profile of the user;
    receiving over said communication network at said video viewing device programming parameters to provide said selected content; and
    generating by said video viewing device said video representation according to said programming parameters.

10. The method as recited in claim 9 wherein said selected content is selected based on a selection criterion from the group consisting of:
    a specified rating,
    an alternative language, and
    an alternative language with subtitles.

11. The method as recited in claim 9 wherein said generating comprises employing an initiation signal.

12. The method as recited in claim 9 wherein said request to program is initiated by at least one from the group consisting of:
    a personal digital assistant,
    a telephony communication,
    a computer,
    a physical interaction, and
    a written correspondence.

13. The method as recited in claim 9 wherein said send and said receiving is via the Internet.

14. A method of receiving a video representation, comprising:
    receiving a request to program a video viewing device to record a video presentation employing a selected content, said selected content including a selectable one of an exclusion of advertisements, an arrangement of advertisements at an end of said selected content, and a compilation of targeted advertisements according to a profile of the user; and programming remotely said video viewing device employing said selected content to provide said video representation from said video presentation;
wherein said programming remotely comprises sending programming parameters to the video viewing device over a communications network.

15. The method as recited in claim 14 wherein said selected content is selected based on a selection criterion from the group consisting of:
a specified rating,
an alternative language, and
an alternative language with subtitles.

16. The method as recited in claim 14 wherein said programming comprises employing an initiation signal.

17. The method as recited in claim 14 wherein said request to program is initiated by at least one from the group consisting of:
a personal digital assistant,
a telephony communication,
a computer,
a physical interaction, and
a written correspondence.

18. The method as recited in claim 14 wherein said receiving and said programming is via the Internet.

19. A video delivery system for use with a video presentation, comprising:
a receptor subsystem configured to receive a request from a user to generate a video representation having a selected content of said video presentation, wherein a selection criterion of said selected content includes an alternate language; and
a rejoinder subsystem coupled to said receptor subsystem configured to control a video viewing device configured to generate said video representation for said user based on said request;
wherein said rejoinder subsystem controls said video viewing device through programming parameters based on said request, said programming parameters received over a communications network from said receptor subsystem.

20. The video delivery system of claim 19, wherein said selection criterion further includes said alternative language with subtitles.

21. The video delivery system of claim 19, wherein said selection criterion further includes a specified rating.

* * * * *